United States Patent
Bender (10) Patent No.: US 9,573,024 B2
(45) Date of Patent: Feb. 21, 2017

(54) 3D PRINTED GOLF BALL CORE

(71) Applicant: NIKE, Inc., Beaverton, OR (US)

(72) Inventor: Aaron Bender, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 299 days.

(21) Appl. No.: 14/144,901

(22) Filed: Dec. 31, 2013

(65) Prior Publication Data

US 2015/0182811 A1  Jul. 2, 2015

(51) Int. Cl.
| | |
|---|---|
| A63B 37/04 | (2006.01) |
| A63B 37/06 | (2006.01) |
| A63B 45/00 | (2006.01) |
| B29C 69/02 | (2006.01) |
| A63B 37/00 | (2006.01) |
| B33Y 10/00 | (2015.01) |
| B33Y 80/00 | (2015.01) |
| B29D 99/00 | (2010.01) |
| B29C 67/00 | (2006.01) |
| B29C 43/18 | (2006.01) |
| B29C 45/14 | (2006.01) |
| B29K 21/00 | (2006.01) |
| B29K 101/12 | (2006.01) |

(Continued)

(52) U.S. Cl.
CPC .......... *A63B 45/00* (2013.01); *A63B 37/0064* (2013.01); *A63B 37/0074* (2013.01); *A63B 37/0075* (2013.01); *A63B 37/0076* (2013.01); *B29C 67/0055* (2013.01); *B29C 69/02* (2013.01); *B29D 99/0042* (2013.01); *B33Y 10/00* (2014.12); *B33Y 80/00* (2014.12); *B29C 43/18* (2013.01); *B29C 45/14819* (2013.01); *B29C 2043/182* (2013.01); *B29C 2043/189* (2013.01); *B29K 2021/003* (2013.01); *B29K 2075/00* (2013.01); *B29K 2101/12* (2013.01); *B29L 2031/546* (2013.01)

(58) Field of Classification Search
USPC .................................................. 473/351–378
See application file for complete search history.

(56) References Cited

U.S. PATENT DOCUMENTS

| | | | |
|---|---|---|---|
| 5,783,293 A * | 7/1998 | Lammi ............... | B29C 45/1642 242/435 |
| 6,056,842 A * | 5/2000 | Dalton ............... | A63B 37/0092 156/243 |

(Continued)

OTHER PUBLICATIONS

Ben Woodruff, 3D Printed Golf Balls: Printing Golf Balls on Demand (with YouTube video link), Oct. 25, 2013, The Printing Channel, 1 page.*

(Continued)

*Primary Examiner* — Gene Kim
*Assistant Examiner* — Matthew B Stanczak
(74) *Attorney, Agent, or Firm* — Quinn Law Group, PLLC (57) ABSTRACT

A method of forming a golf ball includes forming a core using a 3D printer, and molding a cover in a surrounding position over the core through at least one of compression molding and injection molding. The core may be formed by printing a first core portion, printing a second core portion, and fusing the first core portion with the second core portion to form the core. Each of the first and second core portions may respectively include a plurality of concentric shells that are sequentially constructed.

13 Claims, 6 Drawing Sheets

(51) Int. Cl.
*B29K 75/00* (2006.01)
*B29L 31/54* (2006.01)

(56) References Cited

U.S. PATENT DOCUMENTS

| | | | | |
|---|---|---|---|---|
| 6,153,034 | A * | 11/2000 | Lipsker | B29C 41/36 156/167 |
| 6,290,797 | B1 | 9/2001 | Gosetti et al. | |
| 6,547,677 | B2 * | 4/2003 | Sullivan | A63B 37/0003 473/351 |
| 6,645,089 | B2 * | 11/2003 | Tsunoda | A63B 37/0003 473/351 |
| 6,676,541 | B2 * | 1/2004 | Cavallaro | A63B 37/0093 473/376 |
| 6,852,044 | B2 * | 2/2005 | Sullivan | A63B 37/0003 473/376 |
| 6,887,166 | B2 * | 5/2005 | Yu | A63B 37/0023 473/351 |
| 6,981,926 | B2 * | 1/2006 | Sullivan | A63B 37/0003 473/376 |
| 6,988,962 | B2 * | 1/2006 | Sullivan | A63B 37/0003 473/376 |
| 7,014,573 | B2 * | 3/2006 | Dalton | A63B 37/0003 473/371 |
| 7,090,798 | B2 | 8/2006 | Hebert et al. | |
| 7,131,914 | B2 * | 11/2006 | Dalton | A63B 45/00 473/370 |
| 7,153,467 | B2 * | 12/2006 | Brum | A63B 37/0003 264/250 |
| 7,407,450 | B2 * | 8/2008 | Dalton | A63B 37/0003 473/361 |
| 9,011,275 | B2 * | 4/2015 | Hebert | A63B 37/0003 473/378 |
| 2002/0019268 | A1 * | 2/2002 | Tsunoda | A63B 37/0003 473/351 |
| 2002/0042308 | A1 * | 4/2002 | Tsunoda | A63B 37/0003 473/351 |
| 2004/0157527 | A1 * | 8/2004 | Omar | G05B 19/4207 446/268 |
| 2009/0111611 | A1 * | 4/2009 | Kimura | A63B 37/0004 473/373 |
| 2010/0048326 | A1 * | 2/2010 | Kimura | A63B 37/0004 473/373 |
| 2010/0298065 | A1 * | 11/2010 | Soracco | A63B 53/04 473/349 |
| 2011/0300968 | A1 * | 12/2011 | Ryu | A63B 37/0043 473/373 |
| 2012/0046124 | A1 | 2/2012 | Sullivan et al. | |
| 2012/0100932 | A1 * | 4/2012 | Watanabe | A63B 37/0031 473/373 |
| 2012/0100933 | A1 * | 4/2012 | Watanabe | A63B 37/0031 473/373 |
| 2012/0157233 | A1 * | 6/2012 | Watanabe | A63B 37/0031 473/373 |
| 2012/0316008 | A1 * | 12/2012 | Watanabe | A63B 37/0031 473/376 |
| 2013/0029787 | A1 * | 1/2013 | Watanabe | A63B 37/0031 473/373 |
| 2013/0097050 | A1 * | 4/2013 | Soracco | G06Q 30/0621 705/26.5 |
| 2013/0270745 | A1 | 10/2013 | Hebert et al. | |
| 2015/0005683 | A1 * | 1/2015 | Balducci | A61H 15/00 601/134 |
| 2015/0182811 | A1 * | 7/2015 | Bender | A63B 45/00 473/376 |
| 2015/0183167 | A1 * | 7/2015 | Molinari | B29C 67/0088 425/167 |

OTHER PUBLICATIONS

Woodruff, '3D Printed Golf Balls: Printing Golf Balls On Demand' http://3dpringingchannel.com/3d-printing-golf-balls-on-demand, Nov. 16, 2013.

* cited by examiner

3D PRINTED GOLF BALL CORE

TECHNICAL FIELD

The present invention relates generally to a golf ball core that is formed through a 3D printing process.

BACKGROUND

The game of golf is an increasingly popular sport at both the amateur and professional levels. To account for the wide variety of play styles and abilities, it is desirable to produce golf balls having different play characteristics.

Attempts have been made to balance a soft feel with good resilience in a multi-layer golf ball by giving the ball a hardness distribution across two to five discrete layers in such a way as to retain both properties. A harder golf ball will generally achieve greater distances, but less spin, and so will be better for drives but more difficult to control on shorter shots. On the other hand, a softer ball will generally experience more spin, thus being easier to control, but will lack distance. Additionally, certain design characteristics may affect the "feel" of the ball when hit, as well as the durability of the ball.

Three dimensional (3D) printing is a process of making a three-dimensional solid object from a digital model. The printing is an additive process, where successive layers are built upon previous layers to "grow" the object. 3D printing is different from other molding or manufacturing techniques that can rely on filling a mold or removing material such as by cutting or drilling.

SUMMARY

A method of forming a golf ball includes forming a core using a 3D printer, and molding a cover in a surrounding position over the core through at least one of compression molding and injection molding. The core may be formed by printing a first core portion, printing a second core portion, and fusing the first core portion with the second core portion to form the core. Each of the first and second core portions may respectively include a plurality of concentric shells that are sequentially constructed.

The first plurality of concentric shells is printed in a sequential manner starting from a shell disposed at a most radially inward position. In one configuration, the first plurality of concentric shells includes a first shell and a second shell. Each of the first and second shells may respectively have a homogeneous material composition. Additionally the material composition of the first shell may be different than the material composition of the second shell. The second core portion may have an identical structure and composition as the first core portion.

Each of the first plurality of concentric shells may be disposed at a different radial position within the first core portion. The printing of the first core portion may include varying the material composition of each respective shell as a function of the radial position of that shell. In one configuration, the first core portion includes a radially inward portion, a radially outward portion, and an intermediate portion that is radially disposed between the radially inward portion and the radially outward portion. In this manner, the radially inward portion may be formed from a first material, the radially outward portion may be formed from a second material, and the intermediate portion may be a varying blend of the first material and the second material In one configuration, fusing the first core portion with the second core portion includes placing the first core portion and second core portion in an opposing arrangement within a mold, and heating the mold to a temperature above the melting point of each of the respective first core portion and second core portion. Alternatively, the two core portions may be fused by printing the second core onto the first core portion.

The above features and advantages and other features and advantages of the present invention are readily apparent from the following detailed description of the best modes for carrying out the invention when taken in connection with the accompanying drawings.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; about or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges includes disclosure of all values and further divided ranges within the entire range. Each value within a range and the endpoints of a range are hereby all disclosed as a separate embodiment. In this description of the invention, for convenience, "polymer" and "resin" are used interchangeably to encompass resins, oligomers, and polymers. The terms "comprises," "comprising," "including," and "having," are inclusive and therefore specify the presence of stated items, but do not preclude the presence of other items. As used in this specification, the term "or" includes any and all combinations of one or more of the listed items. When the terms first, second, third, etc. are used to differentiate various items from each other, these designations are merely for convenience and do not limit the items.

DETAILED DESCRIPTION

Figure 1:
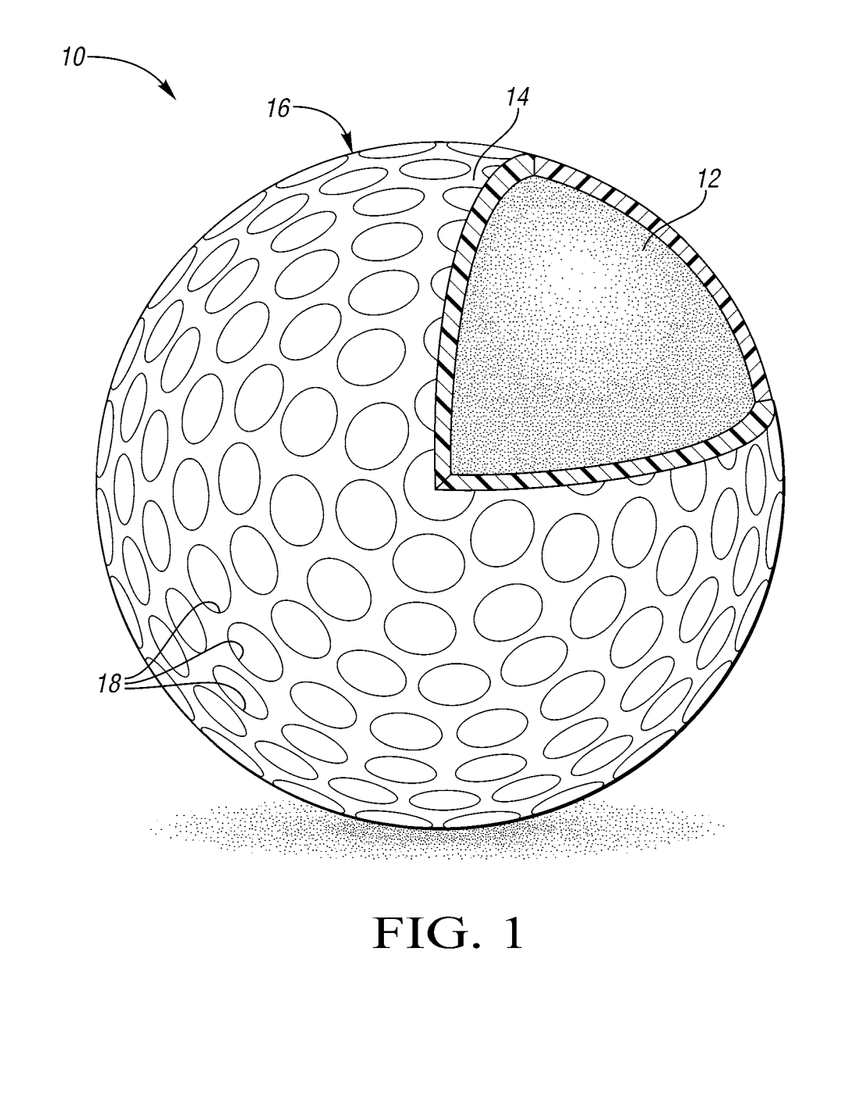
FIG. 1 is a schematic partial cut-away view of a multi-layer golf ball having a cover and a core.

Referring to the drawings, wherein like reference numerals are used to identify like or identical components in the various views, FIG. 1 schematically illustrates a golf ball 10 that includes a thermoplastic core 12, and a cover 14 surrounding the core 12. While the illustrated ball 10 has a two-piece construction (i.e., core 12 and cover 14), in other embodiments, the ball 10 may be a three or more piece construction, with additional intermediate layers (including, for example, a cross-linked thermoset layer) disposed between the cover 14 and the core 12. In the two-piece embodiment illustrated, the core 12 may have a diameter of, for example, from about 22 mm to about 42 mm. In a three-piece ball, the core 12 may have a diameter of, for example, from about 22 to about 32 mm. It should be noted that for the purposes of this description, if one layer "radially surrounds" another layer (such as the cover radially surrounding the core), it should not be inferred that the two layers are necessarily in contact, as other intermediate layers may be disposed in between.

In general, the cover 14 may define an outermost portion 16 of the ball 10, and may include any desired number of dimples 18, including, for example, between 280 and 432 total dimples, and in some examples, between 300 and 392 total dimples, and typically between 298 to 360 total dimples. As known in the art, the inclusion of dimples generally decreases the aerodynamic drag of the ball, which may provide for greater flight distances when the ball is properly struck.

In a completely assembled ball 10, the cover 14 may be substantially concentric with the core 12 such that they share a common geometric center. Additionally, the mass distribution of the cover 14 and core 12 may be uniform such that their respective centers of mass, and the center of mass for the ball 10 as a whole, is coincident with the geometric center.

The cover 14 may generally be formed from a thermoplastic material that may be either compression molded or injection molded about the core 12. In one configuration, the cover 14 may be formed from a thermoplastic polyurethane that may have a flexural modulus of up to about 1000 psi. In other embodiments, the cover 14 may be formed from a ionomer, such as commercially available from the E. I. du Pont de Nemours and Company under the tradename Surlyn®. When a thermoplastic polyurethane is used, the cover 14 may have a hardness measured on the Shore-D hardness scale of up to about 65, measured on the ball. In other embodiments, the thermoplastic polyurethane cover may have a hardness measured on the Shore-D hardness scale of up to about 60, measured on the ball. If other ionomers are used to form the cover layer, the cover may have a hardness measured on the Shore-D hardness scale of up to about 72, measured on the ball.

Figure 2:
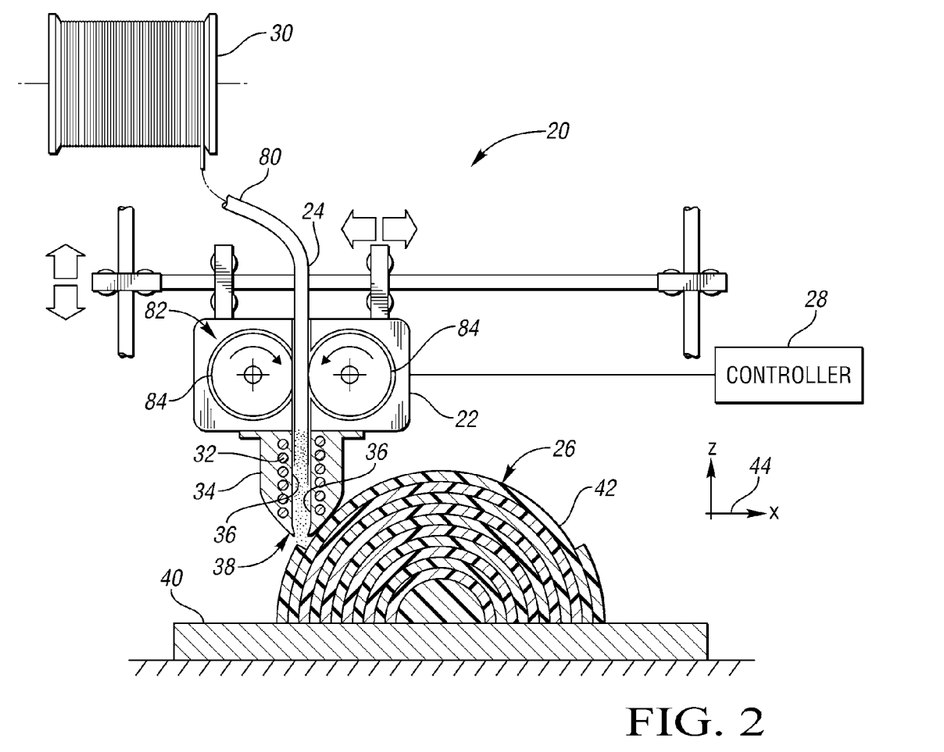
FIG. 2 is a schematic cross-sectional side view of a 3D printer printing a core portion using Cartesian-based control.

The core 12 may be formed using a 3D printing process, and may have a composition that varies as a function of a radial dimension. In general, 3D printing is an additive part-forming technique that incrementally builds an object by applying a plurality of successive thin material layers. FIG. 2 schematically illustrates one embodiment of a 3D printer 20 that may be used to form the core 12, which employs a 3D printing technique known as fused filament fabrication.

In general, a 3D printer 20 includes a print head 22 configured to controllably deposit/bind a stock material 24 onto a substrate 26, and motion controller 28 that is configured to controllably translate a print head 22 within a predefined workspace. In fused filament fabrication, the print head 22 may be configured to receive the solid stock material 24 from a source such as a spool 30 or hopper, melt the stock material 24 (e.g., using a resistive heating element 32), and expel the molten stock material 24 onto the substrate 26 via a nozzle 34. In general, the nozzle 34 may define an orifice 36 at its distal tip 38 through which the molten material 24 may exit the print head 22.

Once out of the nozzle 34, the molten stock material 24 may begin cooling, and may re-solidify onto the substrate 26. The substrate 26 may either be a work surface 40 that serves as a base for the object, or may be a previously formed/solidified material layer 42. In the case where the molten stock material 24 is applied over a previously formed material layer 42, the temperature of the molten stock material 24 may cause localized surface melting to occur in the previously formed material layer 42. This localized melting may aid in bonding the newly applied material with the previously formed layers 42.

Figure 3:
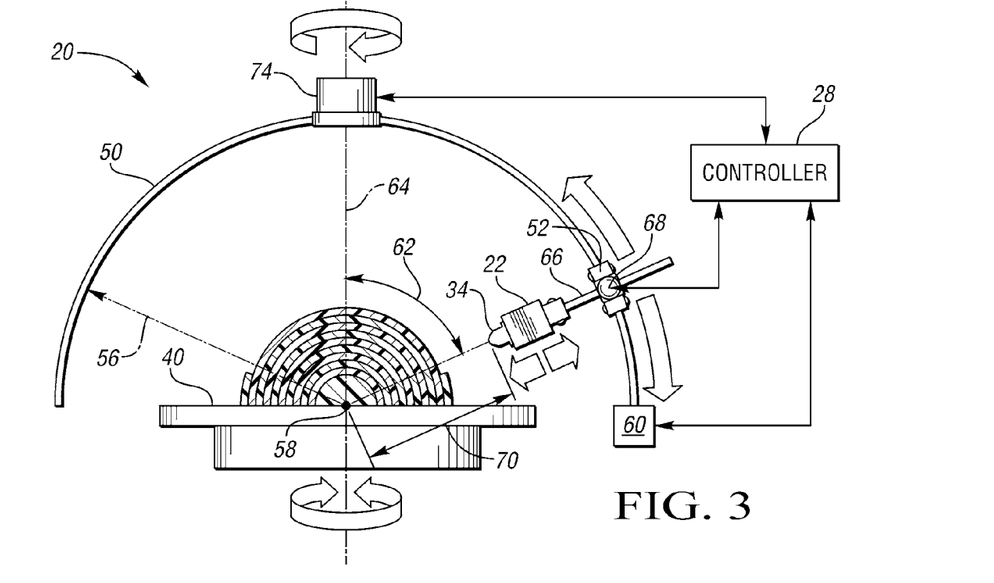
FIG. 3 is a schematic cross-sectional side view of a 3D printer printing a core portion using spherical-based control.

In one configuration, the print head 22 may be controlled within a Cartesian coordinate system 44, where three actuators can each cause a resultant motion of the print head in a respective orthogonal plane (where convention defines the X-Y plane as a plane parallel to the work surface 40, and the Z-direction as a dimension orthogonal to the work surface 40). In another configuration, such as shown in FIG. 3, the 3D printer 20 may be natively controllable in a spherical coordinate system (i.e., a radial position, a polar angle, and an azimuth angle (r, θ, φ)). In either configuration (i.e., Cartesian control or spherical control), the core 12 may be formed by printing a plurality of shells of increasing size to build up a solid hemisphere or sphere.

To accomplish the spherical control, the illustrated 3D printer 20 includes an arcuate track 50 that is configured to support a movable carriage 52. The arcuate track 50 is generally disposed within a track plane that is orthogonal to the work surface 40. Additionally, the track 50 may have a constant radius of curvature 56 that extends from a point 58 disposed on the adjacent work surface 40.

The movable carriage 52 is supported on the arcuate track 50 using, for example, one or more wheel, bearing, or bushing assemblies that may allow it to smoothly translate along the track 50. A first motor 60 and drive mechanism may be associated with the carriage 52 and/or track 50 to controllably translate and/or position the carriage 52 along the track 50. In general, the carriage's position along the track may form an azimuth angle 62 relative to an axis 64 that is normal to the work surface 40. The drive mechanism may include, for example, a chain or belt extending within one or more track elements, or a rack and pinion-style gear drive.

The carriage 52 may movably support an extension arm 66, which may, in turn, support the print head 22. The extension arm 66 may controllably translate relative to the carriage 52 to effectuate a radial movement of the print head 22. In one configuration, the extension arm 66 may translate in a longitudinal direction using, for example, a second motor 68 that is associated with the carriage 52. The second motor 68 may be configured to drive a rack and pinion-style gear arrangement, a ball screw, or lead screw that may be associated with the extension arm 66. The translation of the extension arm 66 may control a radial position 70 of the print head 22.

The motion controller 28 may be in electrical communication with both the first motor 60 and the second motor 68 to respectively control the azimuth angle 62 and radial positioning 70 of the print head 22. The motion controller 28 may be embodied as one or multiple digital computers, data processing devices, and/or digital signal processors (DSPs), which may have one or more microcontrollers or central processing units (CPUs), read only memory (ROM), random access memory (RAM), electrically-erasable programmable read only memory (EEPROM), high-speed clock, analog-to-digital (A/D) circuitry, digital-to-analog (D/A) circuitry, input/output (I/O) circuitry, and/or signal conditioning and buffering electronics. The motion controller 28 may further be associated with computer readable non-transitory memory having stored thereon a numerical control program that specifies the positioning of the print head 22 relative to the work surface 40 in spherical coordinates.

While the azimuth angle 62 and radial positioning 70 of the print head 22 may be controlled by motors 60, 68, the polar angle may be controlled through either a rotation of the track relative to the work surface 40, or through a rotation of the work surface 40 relative to the track 50.

In one configuration, the 3D printer 20 (whether controlled in spherical coordinates, Cartesian coordinates, or through another manner of control) may build up a or spherical solid by printing a plurality of concentric shells/layers at incrementing radial distances. In one configuration, these shells may be generally, however, more unique geometries may also be created by interspersing one or more voids or material inlays within a shell layer. In one configuration, each shell layer may be formed from a plurality of rings of material that are each at a different azimuth angle 62 between 90 degrees and 0 degrees. In another configuration, each shell layer may be formed from a plurality of arcs of material that extend away from the work surface 40 (e.g., in an X-Z plane, with the arcs increment along the Y-axis).

Referring again to FIG. 2, in one configuration, the print head 22 may receive the solid stock material 24 in the form of a thermoplastic filament 80 that is drawn into the print head 22 by a feed mechanism 82. The feed mechanism 82 may include, for example, a pair of wheels 84 disposed on opposite sides of the filament 80 that may controllably rotate in opposing directions (and at approximately equal edge velocities).

Once in the print head 22, the stock material 24 may pass by a heating element 86 (i.e., a primary heating element 86) that may melt the thermoplastic. In one configuration, the primary heating element 86 may be located within a body portion 88 of the print head, and may include, for example, a resistive heating element.

Figure 4:
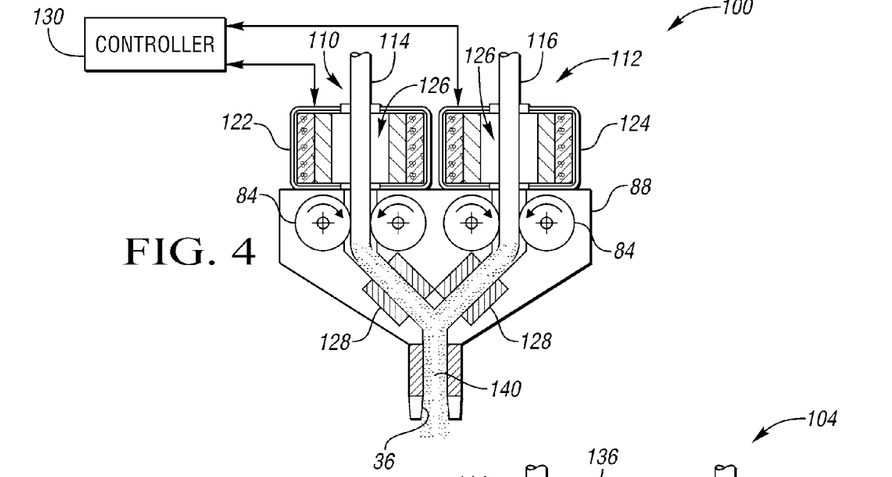
FIG. 4 is a schematic cross-sectional side view of a first embodiment of a 3D print head capable of controllably blending two materials.
Figure 5:
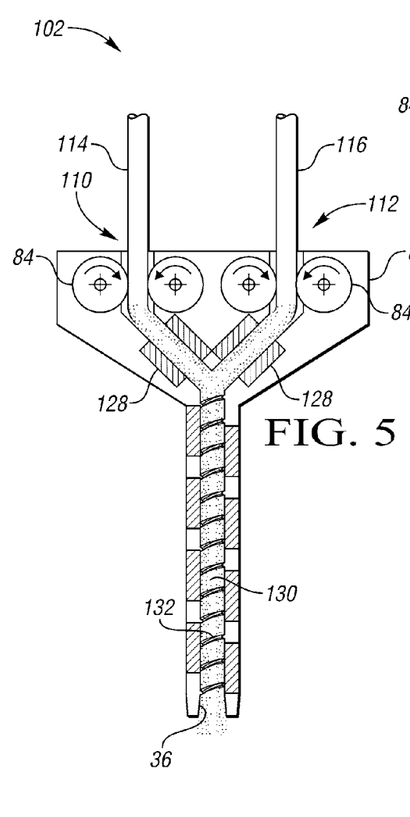
FIG. 5 is a schematic cross-sectional side view of a second embodiment of a 3D print head capable of controllably blending two materials, including an elongate nozzle.
Figure 6:
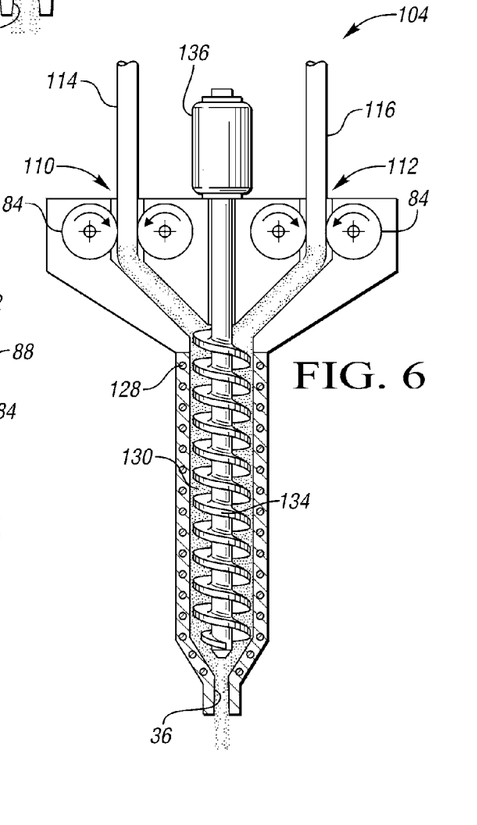
FIG. 6 is a schematic cross-sectional side view of a third embodiment of a 3D print head capable of controllably blending two materials, including an elongate nozzle and an active mixing element.

While FIG. 2 illustrates a print head 22 capable of printing a single material, FIGS. 4-6 schematically illustrate three different print heads 100, 102, 104, which are each capable of forming a solid object that is a blend of two different polymers. As shown, each embodiment 100, 102, 104 includes a first feed mechanism 110 and a second feed mechanism 112 that are each respectively configured to continuously draw material into the print head. Each feed mechanism 110, 112 is respectively configured to receive a different stock material 114, 116 that may be obtained, for example from a different material spool. The total flow of the molten material through the orifice 36 would then be the sum of the material received by the respective feed mechanisms 110, 112. The feed mechanisms 110, 112 may therefore be controlled by specifying the desired composition ratio and the desired output flow rate.

The first and second feed mechanisms 110, 112 may be individually controlled, for example, via a feed controller 120, such as shown in FIG. 4. In one configuration, the feed controller 120 may be integrated with the motion controller 28 described above, where the numerical control program that specifies print head motion is further used to specify the respective feed rates. Each feed mechanism 110, 112 may include, for example, a respective motor 122, 124 that may be used to drive the feed wheels 84 in opposing directions (e.g., through one or more gears or similar force transfer elements). In one configuration, the motors 122, 124 may have an annular in shape, where the filament may pass through a hollow core 126.

As each respective filament enters the body portion 88 of the print head 100, it may be melted by a respective primary heating element 128. In one configuration, each filament may have a different primary heating element that, for example, may be able to adjust its thermal output according to the feed rate and melting point of the respective filament. In another configuration, both primary heating elements 128 may be interconnected such that they both output a similar amount of thermal energy. The primary heating elements 128 may include, for example, a resistive wire, film, or strip that may be wrapped around a material passageway within the body portion 88 of the print head 100.

Once past the primary heating element, the molten materials may enter a mixing cavity 130 that may be partially or entirely disposed within the nozzle 34. In one configuration, such as shown in FIG. 4, the mixing cavity 130 may be a smooth sided cylinder, where the molten materials may mix by virtue of their converging flow paths. In a slight variant on the entirely smooth-sided design, the entrance to the mixing cavity 130 (i.e., where the two flow paths converge) may define a nozzled portion that increases flow turbulence to further facilitate mixing of the two materials.

In yet another configuration, such as generally shown in FIG. 5, the mixing cavity 130 may include one or more surface features to promote increased mixing. For example, the mixing cavity 130 may include internal threads 132 along a portion or along the entire length. The internal threads 132 (or other mixing features) may serve to passively agitate and/or mix the molten materials as they pass toward the orifice 36. In this manner, the geometry of the mixing cavity may aid in providing a homogeneous mixture of the two stock materials.

In another configuration, the two molten materials may be mixed using an active means. For example, as shown in FIG. 6, a power screw 134 may be disposed within the mixing cavity 130 to actively mix the two materials together. The power screw 134 (or other mixing element) may be either driven by a separate, mixing motor 136, or by one or both of the motors that are responsible for feeding the stock materials into the print head. In addition to providing a mixing effect, the power screw may also aid the material mixture in flowing through the nozzle. While FIGS. 4-6 only show print head embodiments that include two feeder mechanisms, these designs may easily be expanded to three or more feeder mechanisms to suit the required application. Additional detail and embodiments of a 3D printer configured to print a solid hemisphere via a plurality of printed shells is found in co-filed U.S. Patent Application Publication No. US 2015/0183161, entitled "3D Print Head," which is hereby incorporated by reference in its entirety.

Figure 7A:
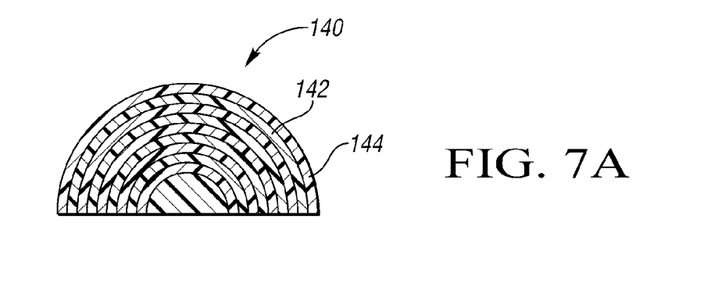
FIG. 7A is a schematic cross-sectional view of the forming of a core portion of a golf ball.

In one configuration, a golf ball core 12 may be formed by individually printing two polymeric core portions/hemispheres, and subsequently fusing them together to form a solid sphere. For example, as shown in FIG. 7A a 3D printer may begin by forming a solid object 140, via a plurality of layers 142. Each layer 142 may be formed by molding a plurality of discrete rings 144 or arcs in an arrangement that collectively forms a shell.

Figure 7B:
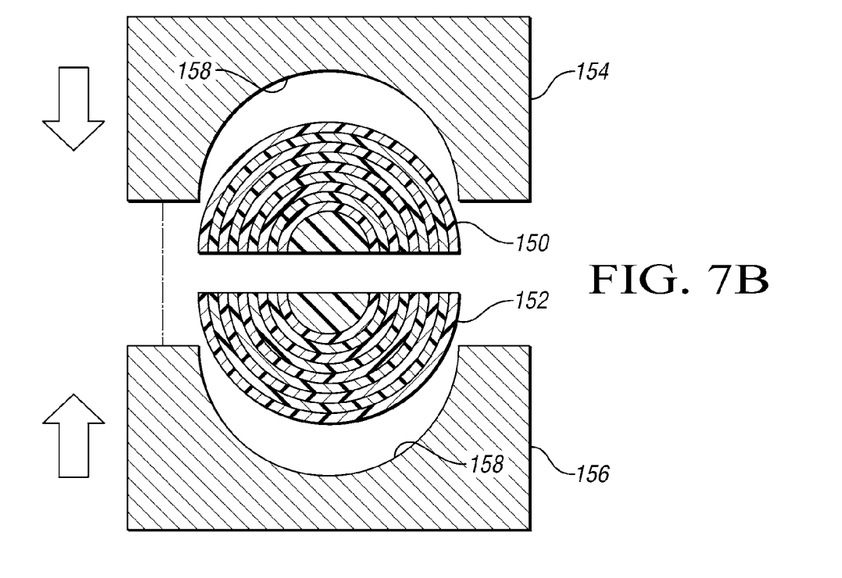
FIG. 7B is a schematic cross-sectional view of a first and second core portion being placed in a mold having a spherical recess.
Figure 7C:
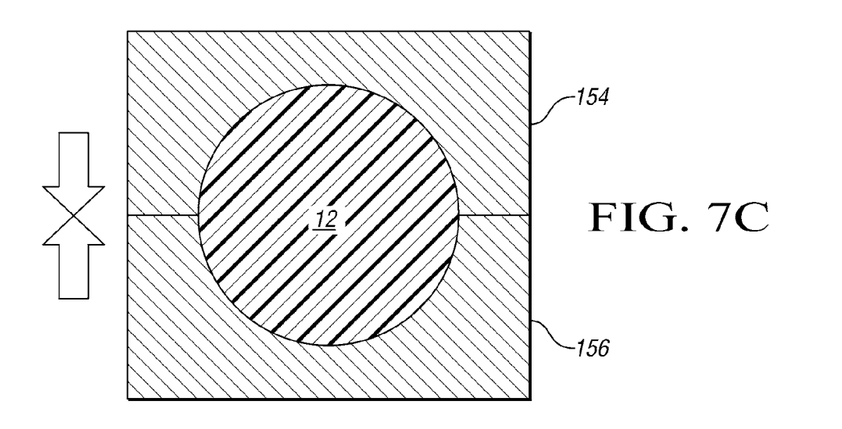
FIG. 7C is a schematic cross-sectional view of the first and second core portions of FIG. 7B being fused together within the mold.

Once two identical hemispheres 150, 152 are formed, they may be fused or molded together, such as schematically illustrated in FIGS. 7B and 7C. As shown in FIG. 7B, a pair of opposing mold halves 154, 156 may cooperate to define a spherical recess 158 that has a diameter about equal to the diameter of the hemispheres 150, 152. The hemispheres 150, 152 may be inserted within the spherical recess 158, upon which the mold halves 154, 156 may be brought together and heated to a temperature that is at or above the melting point of the polymeric hemispheres 150, 152. The application of heat may soften and/or partially melt the hemispheres 150, 152 as the polymer is heated by the mold. Once the hemispheres 150, 152 are brought to an appropriate temperature, the mold may be allowed to cool (or may be actively cooled), which may resolidify/harden the polymer, resulting in the hemispheres 150, 152 being fused together to form a sphere. In one configuration, this process may further involve compression molding an intermediate layer about the core, where the heat of the compression molding process fuses the hemispheres 150, 152 together. In other embodiments, the halves may be fused together through other methods of joining, such as spin welding, ultrasound welding, or laser welding.

Figure 8A:
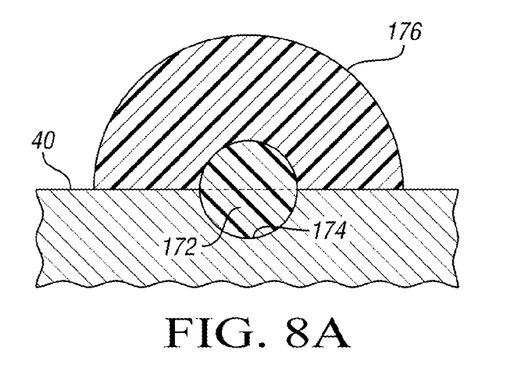
FIG. 8A is a schematic cross-sectional view of a first core portion being formed over a pre-molded inner core.
Figure 8B:
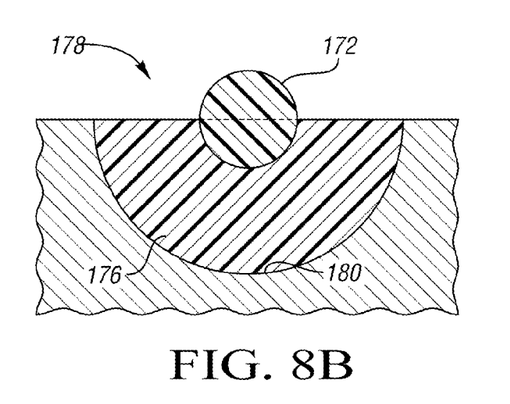
FIG. 8B is a schematic cross-sectional view of the assembly of FIG. 8A being flipped such that the first core portion is disposed within a recess defined by a work surface.
Figure 8C:
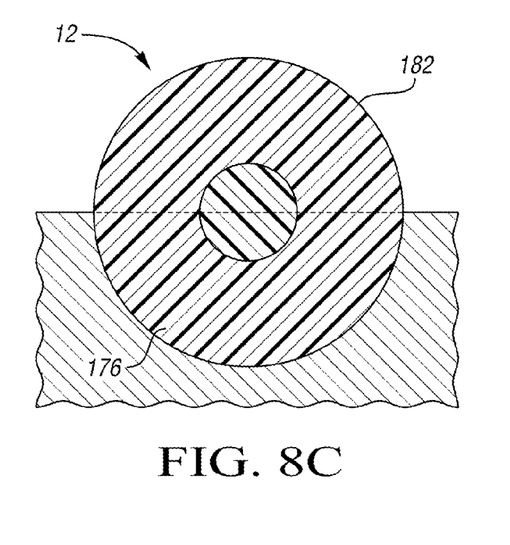
FIG. 8C is a schematic cross-sectional view of a second core portion being formed over a pre-molded inner core and fused with a first core portion.

In another configuration, such as shown in FIGS. 8A-8C, the 3D printer 20 may form the core 12 by directly printing an outer-core material 170 onto a pre-formed inner core 172. In this method, an inner core 172 may first be formed using a molding technique such as injection molding, compression molding, or casting. The inner core 172 may then be placed into a recess 174 in the otherwise planar work surface 40. The recess 174 may have a diameter about equal to the diameter of the inner core 172. The 3D printer 20 may then print a first outer core portion 176 onto the inner core 172, such as shown in FIG. 8A.

Once the first outer-core portion 176 is formed, the partially formed core assembly 178 may be flipped and the outer core portion 176 may be inserted into a second recess 180 in the work surface 40 (such as shown in FIG. 8B). The 3D printer 20 may then complete the assembly of the core 12 by printing a second core portion 182 (identical to the first outer core portion 176) onto the partially formed core assembly 178, such as shown in FIG. 8C.

Therefore, as generally described in relation to FIGS. 7A-7C and 8A-8C, the golf ball core 12 may be formed by printing a first core portion and printing a second. Each respective core portion may include a respective plurality of concentric shells. The process may also include fusing the first core portion with the second core portion to form the core. As shown in FIG. 7A-7C, this may involve a distinct process, such as fusing via a heated mold, or, as shown in FIGS. 8A-8C, the fusing may occur by virtue of printing the second core portion directly onto the first core portion (i.e., where the molten material may temporarily melt a localized portion of the first core portion to cause a the two portions to be fused together).

3D printing may have certain definite advantages over other molding/forming techniques such as injection molding or compression molding. In particular, when using multi-filament capable print heads, such as schematically illustrated in FIGS. 4-6, 3D printing may provide an economical and method of creating a core 12 with a variable material composition.

Figure 9:
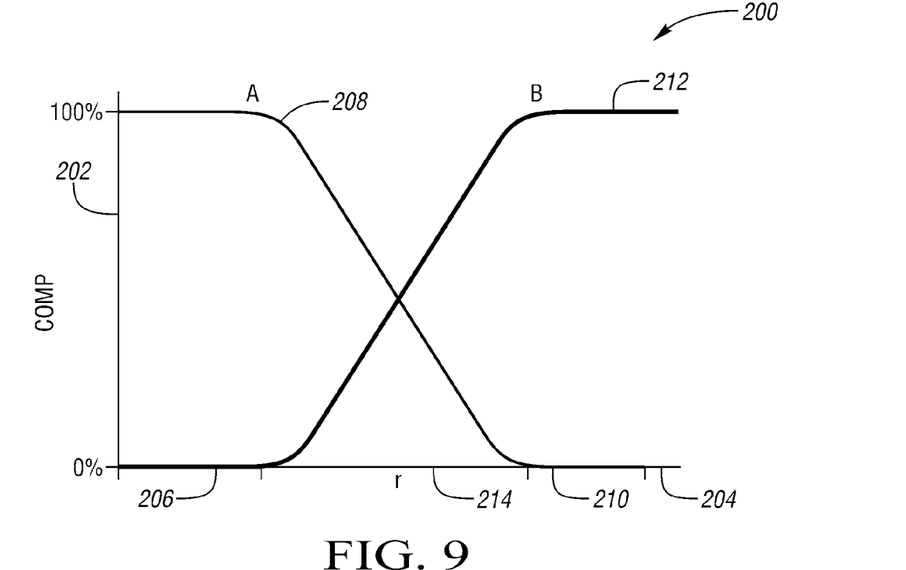
FIG. 9 is a schematic graph of the material composition of an embodiment of a 3D printed core for a golf ball as a function of a radial distance from the center of the hemisphere.

FIG. 9 generally illustrates a graph 200 of material composition 202 of one possible two-material core as a function of the radial position 204 (where material composition 212 is measured on a percentage basis between 0% and 100%). As shown, the 3D printer may vary the composition with each successive shell such that the innermost portion 206 of the hemisphere is entirely made from a first material 208, the outermost portion 210 of the hemisphere is entirely made from a second material 212, and an intermediate portion 214 is formed from a varying blend of the first material 208 and the second material 212. In one configuration, the curves may have a slightly stair-stepped appearance that may be attributable to the discrete thicknesses of the varying layers. Once formed in this manner, it is possible for the material composition to achieve an even smoother gradient using one or more post-processing procedures such as heat-treating, which may soften and/or melt the layers to cause localized diffusion (e.g., during the fusion of the hemispheres such as shown in FIG. 7B-7C). In one golf ball core configuration, the printed layer thickness may be from about 0.1 mm to about 2 mm, or from about 0.1 mm to about 1.2 mm, and the total number of shells/layers may be from about 9 to about 200 or more (i.e., per hemisphere). In another embodiment, the printed layer thickness may be less than 0.1 mm, such as from about 0.01 mm to about 0.1 mm; however, using such thicknesses may present a manufacturing hurdle, as production speed and printing resolution are inversely proportional. To provide a suitable balance of speed vs. resolution, the layer thickness may be from about 0.4 mm to about 1.2 mm, and the total number of layers may be from about 9 to about 55.

Figure 10:
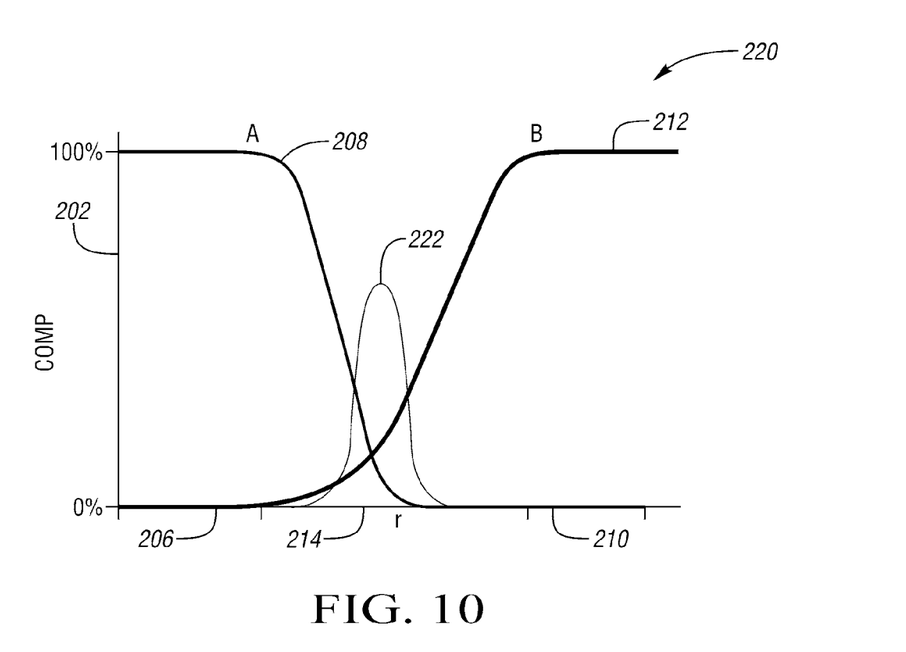
FIG. 10 is a schematic graph of the material composition of an embodiment of a 3D printed core for a golf ball as a function of a radial distance from the center of the hemisphere.

FIG. 10 generally illustrates a graph 220 of the material composition 202 of one possible three-material core as a function of the radial position 204. This graph 220 is similar to the graph 200 provided in FIG. 9, except that a third, transition material 222 has been included within the intermediate portion 214.

While it is common to construct a golf ball by radially stacking three to five discrete material layers (e.g., by overmolding or compression molding the layers in succession), multi-material 3D printing allows for a more gradual transition/gradient, rather than a discrete boundary. In a conventional, discrete-layered multi-piece or multi-layer ball design, each layer may have the tendency to react differently to the stress imparted by an impact. In particular, due to the varying characteristics of the materials used, the stress/strain response of the ball may be non-uniform/non-linear across the ball, particularly at the boundaries between different materials. These non-uniformities may result in the occurrence of stress concentration points during an impact, which, over time, may degrade the performance of the golf ball 10. The more gradual transition presented through 3D printing may make the boundary effects less apparent.

In addition to causing stress concentration points, the existence of discrete material boundaries may also result in non-uniform stress propagation during the impact. That is, during an impact, forces imparted to the ball may initially be localized at the point of impact. Over a short period of time (e.g., less than 500 μs), these stresses may propagate throughout the ball, where they are eventually converted into other forms of energy and/or dissipated. This stress propagation may be viewed as a pressure wave that induces one or more dynamic viscoelastic deformations, including vibrational modes, of the golf ball 10. The viscoelastic dissipation that dampens any acoustic waves may have an effect on the acoustic response of the ball to a player, and the viscoelastic responses to the impact stress may have an effect on the response of the ball during and after the impact.

By blending the transition zones and eliminating stark, discrete boundary interfaces, the efficiency of the force transmission between the different materials and/or portions of the ball is increased, and the amount of energy that is dissipated at impact is correspondingly decreased.

In another embodiment, the various layers that are printed may include discontinuities, or voids that may either remain unfilled (i.e., as pockets of air within the ball), or may be filled with another material. Said another way, at least one layer may be discontinuous, meaning that it is not formed from a single, homogeneous material composition; instead, it may include one or more voids (filled or unfilled) disposed through the shell. With a filled void, the filler material may be either printed in place, or may be filled through an overmolding process, such as injection molding. The use of strategically placed voids through one or more layers may be used to change the structural, acoustic, or dynamic properties of the ball.

The use of one or more discontinuous shell layers may be employed, for example, to form a core having a varying surface geometry. For example, the above-described 3D printing techniques may be used to form a core having a surface geometry such as disclosed in U.S. patent application Ser. No. 13/935,953, filed on Jul. 5, 2013 to Ishii et al. and entitled "Multi-layer Golf Ball," which is hereby incorporated by reference in its entirety, or such as generally disclosed in U.S. patent application Ser. No. 13/935,977, filed on Jul. 5, 2013 to Ishii et al. and entitled "Multi-layer Golf Ball," which is hereby incorporated by reference in its entirety, or in U.S. patent application Ser. No. 13/935,944, filed on Jul. 5, 2013 to Ishii et al. and entitled "Multi-layer Golf Ball," which is hereby incorporated by reference in its entirety. In yet another embodiment, a spherical center portion may be initially formed through, for example, injection molding, compression molding, or casting, and a varying surface geometry, such as those disclosed above, may be printed directly onto the pre-formed spherical center portion. Such a technique may permit more aggressive surface geometries than would otherwise be capable through simple injection molding (i.e., where mold undercut may prohibit the finished part from being ejected from the finished mold if the features/channels were too deep).

Materials

As noted above, the core may be printed from a blend of two or more thermoplastic materials, each of which have been drawn or extruded into a suitable filament form. The thermoplastic materials may be elastomeric or nonelastomeric (rigid or engineering) thermoplastics. These may be used in any combination, including a blend of two or more elastomeric thermoplastic materials, a blend of two or more nonelastomeric or rigid thermoplastic materials, or a blend of at least one elastomeric thermoplastic material and at least one nonelastomeric or rigid thermoplastic material.

Nonlimiting examples of suitable thermoplastic elastomers that can be blended to form the printed core include metal cation ionomers of addition copolymers of ethylenically unsaturated acids ("ionomer resins"), metallocene-catalyzed block copolymers of ethylene and α-olefins having 4 to about 8 carbon atoms, thermoplastic polyamide elastomers (PEBA or polyether block polyamides), thermoplastic polyester elastomers, thermoplastic styrene block copolymer elastomers such as poly(styrene-butadiene-styrene), poly(styrene-ethylene-co-butylene-styrene), and poly(styrene-isoprene-styrene), thermoplastic polyurethane elastomers, thermoplastic polyurea elastomers, and dynamic vulcanizates of rubbers in these thermoplastic elastomers and in other thermoplastic matrix polymers.

Nonlimiting examples of suitable nonelastomeric thermoplastic materials include acrylic polymers (also called polyacrylates); other vinyl polymers and copolymers including acrylonitirile-butadiene-sytrene copolymer (ABS), styrene-acrylonitrile (SAN), olefin-modified SAN, acrylonitrile-styrene-acrylonitrile, styrene-maleic anhydride (S/MA) polymer, polyvinyl alcohol (PVOH), ethylene vinyl acetate copolymers (EVA); ethylene methyl acrylates; polyvinyl chloride resins, and maleic anhydride grafted polymers; polycarbonates; nonelastomeric polyesters, polyamides, polyurethanes, polyureas, and polyurethane-polyurea copolymers; polyimides, polyphenylene ethers, polyphenylene sulfides, polysulfones, polyphenylsulfones, polyamide-imides, impact-modified polyphenylene ethers, high impact polystyrenes, diallyl phthalate polymers, polyetheretherketones (PEEK), and polyolefins such as polypropylene and high density polyethylene.

Ionomer resins, which are metal cation ionomers of addition copolymers of ethylenically unsaturated acids, are preferably alpha-olefin, particularly ethylene, copolymers with $C_3$ to $C_8$ α,β-ethylenically unsaturated carboxylic acids, particularly acrylic or methacrylic acid. The copolymers may also contain a softening monomer such as an alkyl acrylate or methacrylate, for example a $C_1$ to $C_8$ alkyl acrylate or methacrylate ester. The α,β-ethylenically unsaturated carboxylic acid monomer may be from about 4 weight percent or about 6 weight percent or about 8 weight percent up to about 20 weight percent or up to about 35 weight percent of the copolymer, and the softening monomer, when present, is preferably present in a finite amount, preferably at least about 5 weight percent or at least about 11 weight percent, up to about 23 weight percent or up to about 25 weight percent or up to about 50 weight percent of the copolymer.

Nonlimiting specific examples of acid-containing ethylene copolymers include copolymers of ethylene/acrylic acid/n-butyl acrylate, ethylene/methacrylic acid/n-butyl acrylate, ethylene/methacrylic acid/isobutyl acrylate, ethylene/acrylic acid/isobutyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include copolymers of ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate. In various embodiments the most preferred acid-containing ethylene copolymers include ethylene/(meth)acrylic acid/n-butyl acrylate, ethylene/(meth)acrylic acid/ethyl acrylate, and ethylene/(meth)acrylic acid/methyl acrylate copolymers.

The ionomer resin may be a high acid ionomer resin. In general, ionomers prepared by neutralizing acid copolymers including at least about 16 weight % of copolymerized acid residues based on the total weight of the unneutralized ethylene acid copolymer are considered "high acid" ionomers. In these high modulus ionomers, the acid monomer, particularly acrylic or methacrylic acid, is present in about 16 to about 35 weight %. In various embodiments, the copolymerized carboxylic acid may be from about 16 weight %, or about 17 weight % or about 18.5 weight % or about 20 weight % up to about 21.5 weight % or up to about 25 weight % or up to about 30 weight % or up to about 35 weight % of the unneutralized copolymer. A high acid ionomer may be combined with a "low acid" ionomer in which the copolymerized carboxylic acid is less than 16 weight % of the unneutralized copolymer.

The acid moiety in the ethylene-acid copolymer is neutralized by any metal cation. Suitable preferred cations include lithium, sodium, potassium, magnesium, calcium, barium, lead, tin, zinc, aluminum, or a combination of these cations; in various embodiments alkali metal, alkaline earth metal, or zinc cations are particularly preferred. In various embodiments, the acid groups of the ionomer may be neutralized from about 10% or from about 20% or from about 30% or from about 40% to about 60% or to about 70% or to about 75% or to about 80% or to about 90%. In various embodiments, the third thermoplastic material includes a high acid monomer neutralized from about 10% or from about 20% or from about 30% or from about 40% to about 60% or to about 70% or to about 75% or to about 80% or to about 90%.

A sufficiently high molecular weight, monomeric organic acid or salt of such an organic acid may be added to the acid copolymer or ionomer so that the acid copolymer or ionomer can be neutralized, without losing processability, to a level above the level that would cause the ionomer alone to become non-melt-processable. The high-molecular weight, monomeric organic acid its salt may be added to the ethylene-unsaturated acid copolymers before they are neutralized or after they are optionally partially neutralized to a level between about 1 and about 100%, provided that the level of neutralization is such that the resulting ionomer remains melt-processable. In generally, when the high-molecular weight, monomeric organic acid is included the acid groups of the copolymer may be neutralized from at least about 40 to about 100%, preferably from at least about 90% to about 100%, and most preferably 100% without losing processability. Such high neutralization, particularly to levels greater than 80%, greater than 90% or greater than 95% or most preferably 100%, without loss of processability can be done by (a) melt-blending the ethylene α,β-ethylenically unsaturated carboxylic acid copolymer or a melt-processable salt of the copolymer with an organic acid or a salt of organic acid, and (b) adding a sufficient amount of a cation source up to 110% of the amount needed to neutralize the total acid in the copolymer or ionomer and organic acid or salt to the desired level to increase the level of neutralization of all the acid moieties in the mixture preferably to greater than 90%, preferably greater than 95%, or preferably to 100%. To obtain 100% neutralization, it is preferred to add a slight excess of up to 110% of cation source over the amount stoichiometrically required to obtain the 100% neutralization.

The high molecular weight, monomeric saturated or unsaturated acid may have from 8 or 12 or 18 carbon atoms to 36 carbon atoms or to less than 36 carbon atoms. Nonlimiting suitable examples of the high-molecular weight, monomeric saturated or unsaturated organic acids include stearic, behenic, erucic, oleic, and linoleic acids and their salts, particularly the barium, lithium, sodium, zinc, bismuth, chromium, cobalt, copper, potassium, strontium, titanium, tungsten, magnesium, or calcium salts of these fatty acids. These may be used in combinations.

Partially- and fully-neutralized ionomers may optionally be blended or grafted with polymers having functional groups such as maleic anhydride groups, primary or secondary amine groups, epoxide groups, isocyanate groups, hydroxyl groups, sulfonate groups, phosphonate groups, and so on, including polyesters, such as sulfonate- or phosphonate-modified poly(ethylene terephthalate), poly(butylene terephthalate), polypropylene terephthalate), or poly(ethylene naphthenate); polyamides, polyamide-ethers, and polyamide-esters; polyurethanes, polyureas, and polyurethane-polyurea copolymers; non-ionomeric alkylene-unsaturated acid copolymers and terpolymers with esters of unsaturated acids; thermoplastic polyolefin elastomers, such as those described below; polystyrenes, such as poly(styrene-co-maleic anhydride), acrylonitrile-butadiene-styrene, poly (styrene sulfonate), and polyethylene styrene; polypropylenes and polyethylenes grafted with maleic anhydride; polyvinyl chlorides and grafted polyvinyl chlorides; polycarbonates, blends of polycarbonate/acrylonitrile-butadiene-styrene, blends of polycarbonate/polyurethane, blends of polycarbonate/polyester; polyvinyl alcohols; polyarylene ethers; polyimides, polyetherketones, polyamideimides; polycarbonate/polyester copolymers; and maleic anhydride-grafted metallocene-catalyzed polymers. These functionalized polymers may also be used as a second thermoplastic material printed with the ionomers or blends or grafts of ionimers with one of these functionalized polymers, which may be the same or different from the functionalized polymer employed as the second thermoplastic material.

Thermoplastic polyolefin elastomers may also be used. These are metallocene-catalyzed block copolymers of ethylene and α-olefins having 4 to about 8 carbon atoms that are prepared by single-site metallocene catalysis, for example in a high pressure process in the presence of a catalyst system comprising a cyclopentadienyl-transition metal compound and an alumoxane. Nonlimiting examples of the α-olefin softening comonomers include hexane-1 or octene-1. Octene-1 is a preferred comonomer to use. These materials are commercially available, for example, from ExxonMobil under the tradename Exact™ and from the Dow Chemical Company under the tradename Engage™.

The thermoplastic material may include both an ionomer resin and a thermoplastic polyolefin elastomer. The ionomer resin may be made using a monomeric organic acid or salt thereof and wherein the ionomer resin is neutralized from at least about 40%, particularly at least about 90%, to about 100% or one of the other neutralization ranges mentioned above. In various embodiments, the thermoplastic material includes a combination of a metal ionomer of a copolymer of ethylene and at least one of acrylic acid and methacrylic acid, a metallocene-catalyzed copolymer of ethylene and an α-olefin having 4 to about 8 carbon atoms, and a metal salt of an unsaturated fatty acid. This material may be prepared as described in Statz et al., U.S. Pat. No. 7,375,151 or as described in Kennedy, "Process for Making Thermoplastic Golf Ball Material and Golf Ball with Thermoplastic Material, U.S. patent application Ser. No. 13/825,112, filed 15 Mar. 2013, the entire contents of both being incorporated herein by reference.

Suitable thermoplastic styrene block copolymer elastomers that may be used include poly(styrene-butadiene-styrene), poly(styrene-ethylene-co-butylene-styrene), poly (styrene-isoprene-styrene), and poly(styrene-ethylene-co-propylene) copolymers. These styrenic block copolymers may be prepared by living anionic polymerization with sequential addition of styrene and the diene forming the soft block, for example using butyl lithium as initiator. Thermoplastic styrene block copolymer elastomers are commercially available, for example, under the trademark Kraton™ sold by Kraton Polymers U.S. LLC, Houston, Tex. Other such elastomers may be made as block copolymers by using other polymerizable, hard, non-rubber monomers in place of the styrene, including meth(acrylate) esters such as methyl methacrylate and cyclohexyl methacrylate, and other vinyl arylenes, such as alkyl styrenes.

Nonelastomeric thermoplastic polyurethanes are prepared by polymerization of one or more polyisocyanates, particularly diisocyanates, with one or more compounds having two isocyanate-reactive groups (chain extension compounds or extenders) that are low molecular weight (generally 400 daltons or less) and generally nonpolymeric. Thermoplastic polyurethane elastomers such as thermoplastic polyester-polyurethanes, polyether-polyurethanes, and polycarbonate-polyurethanes may be used, including, without limitation, polyurethanes polymerized using as polymeric diol reactants polyethers and polyesters including polycaprolactone polyesters. These polymeric diol-based polyurethanes are prepared by reaction of the polymeric diol (polyester diol, polyether diol, polycaprolactone diol, polytetrahydrofuran diol, or polycarbonate diol), one or more polyisocyanates, and, optionally, one or more chain extension compounds. Chain extension compounds, as the term is being used, are compounds having two or more functional groups reactive with isocyanate groups, such as the diols, amino alcohols, and diamines. Preferably the polymeric diol-based polyurethane is substantially linear (i.e., substantially all of the reactants are difunctional).

Diisocyanates used in making the polyurethane elastomers may be aromatic or aliphatic. Useful diisocyanate compounds used to prepare thermoplastic polyurethanes include, without limitation, isophorone diisocyanate (IPDI), methylene bis-4-cyclohexyl isocyanate (H$_{12}$MDI), cyclohexyl diisocyanate (CHDI), m-tetramethyl xylene diisocyanate (m-TMXDI), p-tetramethyl xylene diisocyanate (p-TMXDI), 4,4'-methylene diphenyl diisocyanate (MDI, also known as 4,4'-diphenylmethane diisocyanate), 2,4- or 2,6-toluene diisocyanate (TDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, meta-xylylenediisocyanate and para-xylylenediisocyanate (XDI), 4-chloro-1,3-phenylene diisocyanate, 1,5-tetrahydro-naphthalene diisocyanate, 4,4'-dibenzyl diisocyanate, and combinations of these. Nonlimiting examples of higher-functionality polyisocyanates that may be used in limited amounts to produce branched thermoplastic polyurethanes (optionally along with monofunctional alcohols or monofunctional isocyanates) include 1,2,4-benzene triisocyanate, 1,3,6-hexamethylene triisocyanate, 1,6,11-undecane triisocyanate, bicycloheptane triisocyanate, triphenylmethane-4, 4',4''-triisocyanate, isocyanurates of diisocyanates, biurets of diisocyanates, allophanates of diisocyanates, and the like.

Nonlimiting examples of suitable diols that may be used as extenders include ethylene glycol and lower oligomers of ethylene glycol including diethylene glycol, triethylene glycol, and tetraethylene glycol; propylene glycol and lower oligomers of propylene glycol including dipropylene glycol, tripropylene glycol, and tetrapropylene glycol; cyclohexanedimethanol, 1,6-hexanediol, 2-ethyl-1,6-hexanediol, 1,4-butanediol, 2,3-butanediol, 1,5-pentanediol, 1,3-propanediol, butylene glycol, neopentyl glycol, dihydroxyalkylated aromatic compounds such as the bis(2-hydroxyethyl) ethers of hydroquinone and resorcinol; p-xylene-α,α'-diol; the bis(2-hydroxyethyl) ether of p-xylene-α,α'-diol; m-xylene-α,α'-diol, and combinations of these. Other active hydrogen-containing chain extenders that contain at least two active hydrogen groups may be used, for example, dithiols, diamines, or compounds having a mixture of hydroxyl, thiol, and amine groups, such as alkanolamines, aminoalkyl mercaptans, and hydroxyalkyl mercaptans, among others. Suitable diamine extenders include, without limitation, ethylene diamine, diethylene triamine, triethylene tetraamine, and combinations of these. Other typical chain extenders are amino alcohols such as ethanolamine, propanolamine, butanolamine, and combinations of these. The molecular weights of the chain extenders preferably range from about 60 to about 400. Alcohols and amines are preferred.

In addition to difunctional extenders, a small amount of a trifunctional extender such as trimethylolpropane, 1,2,6-hexanetriol and glycerol, or monofunctional active hydrogen compounds such as butanol or dimethylamine, may also be included. The amount of trifunctional extender or monofunctional compound employed may be, for example, 5.0 equivalent percent or less based on the total weight of the reaction product and active hydrogen containing groups used.

The polyester diols used in forming a thermoplastic polyurethane elastomer are in general prepared by the condensation polymerization of one or more polyacid compounds and one or more polyol compounds. Preferably, the polyacid compounds and polyol compounds are di-functional, i.e., diacid compounds and diols are used to prepare substantially linear polyester diols, although minor amounts of mono-functional, tri-functional, and higher functionality materials can be included to provide a slightly branched, but uncrosslinked polyester polyol component. Suitable dicarboxylic acids include, without limitation, glutaric acid, succinic acid, malonic acid, oxalic acid, phthalic acid, isophthalic acid, hexahydrophthalic acid, adipic acid, maleic acid, suberic acid, azelaic acid, dodecanedioic acid, their anhydrides and polymerizable esters (e.g., methyl esters) and acid halides (e.g., acid chlorides), and mixtures of these. Suitable polyols include those already mentioned, especially the diols. Typical catalysts for the esterification polymerization are protonic acids, Lewis acids, titanium alkoxides, and dialkyltin oxides.

A polymeric polyether or polycaprolactone diol reactant for preparing thermoplastic polyurethane elastomers may be obtained by reacting a diol initiator, e.g., 1,3-propanediol or ethylene or propylene glycol, with a lactone or alkylene oxide chain-extension reagent. Lactones that can be ring opened by an active hydrogen are well-known in the art. Examples of suitable lactones include, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these. In one preferred embodiment, the lactone is ε-caprolactone. Useful catalysts include those mentioned above for polyester synthesis. Alternatively, the reaction can be initiated by forming a sodium salt of the hydroxyl group on the molecules that will react with the lactone ring. In other embodiments, a diol initiator may be reacted with an oxirane-containing compound or cyclic ether to produce a polyether diol to be used in the polyurethane elastomer polymerization. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The oxirane- or cyclic ether-containing compound is preferably selected from ethylene oxide, propylene oxide, butylene oxide, tetrahydrofuran, and combinations of these. The alkylene oxide polymerization is typically base-catalyzed. The polymerization may be carried out, for example, by charging the hydroxyl-functional initiator compound and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition or polymerized in blocks by sequential addition. Homopolymers or copolymers of ethylene oxide or propylene oxide are preferred. Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of a diol such as any of those mentioned above. Polytetrahydrofuran is also known as polytetramethylene ether glycol (PTMEG).

Aliphatic polycarbonate diols that may be used in making a thermoplastic polyurethane elastomer may be prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

In various embodiments, the polymeric diol preferably has a weight average molecular weight of at least about 500, more preferably at least about 1000, and even more preferably at least about 1800 and a weight average molecular weight of up to about 10,000, but polymeric diols having weight average molecular weights of up to about 5000, especially up to about 4000, may also be preferred. The polymeric diol advantageously has a weight average molecular weight in the range from about 500 to about 10,000, preferably from about 1000 to about 5000, and more preferably from about 1500 to about 4000. The weight average molecular weights may be determined by ASTM D4274.

The reaction of the polyisocyanate, polymeric diol, and diol or other chain extension agent is typically carried out at an elevated temperature in the presence of a catalyst. Typical catalysts for this reaction include organotin catalysts such as stannous octoate, dibutyl tin dilaurate, dibutyl tin diacetate, dibutyl tin oxide, tertiary amines, zinc salts, and manganese salts. Generally, for elastomeric polyurethanes, the ratio of polymeric diol, such as polyester diol, to extender can be varied within a relatively wide range depending largely on the desired flexural modulus of the final polyurethane elastomer. For example, the equivalent proportion of polyester diol to extender may be within the range of 1:0 to 1:12 and, more preferably, from 1:1 to 1:8. Preferably, the diisocyanate(s) employed are proportioned such that the overall ratio of equivalents of isocyanate to equivalents of active hydrogen containing materials is within the range of 1:1 to 1:1.05, and more preferably, 1:1 to 1:1.02. The polymeric diol segments typically are from about 35% to about 65% by weight of the polyurethane polymer, and preferably from about 35% to about 50% by weight of the polyurethane polymer.

Suitable thermoplastic polyurea elastomers may be prepared by reaction of one or more polymeric diamines or polyols with one or more of the polyisocyanates already mentioned and one or more diamine extenders. Nonlimiting examples of suitable diamine extenders include ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), N-(3-aminopropyl)-N-methyl-1,3-propanediamine), 1,4-bis(3-aminopropoxy)butane, diethyleneglycol-di(aminopropyl)ether), 1-methyl-2,6-di-amino-cyclohexane, 1,4-diamino-cyclohexane, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, N,N'-dialkylamino-dicyclohexylmethane, and 3,3'-diethyl-5,5'-dimethyl-4,4'-diamino-dicyclohexylmethane. Polymeric diamines include polyoxyethylene diamines, polyoxypropylene diamines, poly(oxyethylene-oxypropylene)diamines, and poly(tetramethylene ether)diamines. The amine- and hydroxyl-functional extenders already mentioned may be used as well. Generally, as before, trifunctional reactants are limited and may be used in conjunction with monofunctional reactants to prevent crosslinking.

Suitable thermoplastic polyamides may be obtained by: (1) polycondensation of (a) a dicarboxylic acid, such as oxalic acid, adipic acid, sebacic acid, terephthalic acid, isophthalic acid, 1,4-cyclohexanedicarboxylic acid, or any of the other dicarboxylic acids already mentioned with (b) a diamine, such as ethylenediamine, tetramethylenediamine, pentamethylenediamine, hexamethylenediamine, or decamethylenediamine, 1,4-cyclohexanediamine, m-xylylenediamine, or any of the other diamines already mentioned; (2) a ring-opening polymerization of a cyclic lactam, such as ε-caprolactam or ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine. Suitable thermoplastic polyamide elastomers may be made by preparing a carboxylic acid-functional polyamide block, then reacting it with a polymeric ether diol (polyoxyalkylene glycol) such as any of those already mentioned. Polymerization may be carried out, for example, at temperatures of from about 180° C. to about 300° C. Suitable nonelastomeric polyamides include Nylon 6, Nylon 66, Nylon 610, Nylon 11, Nylon 12, Nylon MXD6, and Nylon 46. Specific examples of suitable polyamide block copolymers include NYLON 6, NYLON 66, NYLON 610, NYLON 11, NYLON 12, copolymerized NYLON MXD6, and NYLON 46 based elastomers. Thermoplastic poly(ether amide) block copolymer elastomers (PEBA) are commercially available under the trademark Pebax® from Arkema.

The effects of the type and molecular weights of the soft segment polymeric polyols used in making thermoplastic polyurea elastomers and polyamide elastomers are analogous to the same effects in making thermoplastic polyurethane elastomers.

Thermoplastic polyester elastomers have blocks of monomer units with low chain length that form the crystalline regions and blocks of softening segments with monomer units having relatively higher chain lengths. Thermoplastic polyester elastomers are commercially available under the trademark Hytrel® from DuPont.

Suitable polycarbonates include, but are not limited to, polyphthalate carbonate. The hydrocarbon chain can have saturated or unsaturated bonds, or substituted or unsubstituted aromatic and cyclic groups.

The thermoplastic materials may include combinations of thermoplastic elastomers. In one embodiment, the first or second thermoplastic material includes a combination of a metal ionomer of a copolymer of ethylene and at least one of acrylic acid and methacrylic acid, a metallocene-catalyzed copolymer of ethylene and an α-olefin having 4 to about 8 carbon atoms, and a metal salt of an unsaturated fatty acid. This material may be prepared as described in Statz et al., U.S. Pat. No. 7,375,151 or as described in Kennedy, "Process for Making Thermoplastic Golf Ball Material and Golf Ball with Thermoplastic Material, U.S. patent application Ser. No. 13/825,112, filed 15 Mar. 2013, the entire contents of both being incorporated herein by reference.

The thermoplastic materials may include other polymers. In one example, the first or second thermoplastic material may include dispersed domains of cured rubbers, which may be incorporated in a thermoplastic elastomer matrix via dynamic vulcanization of rubbers in any of these thermoplastic elastomers or in other thermoplastic polymers. One such composition is described in Chen, U.S. patent application Ser. No. 14/029,136, filed 17 Sep. 2013. Another such composition is described in Voorheis et al, U.S. Pat. No. 7,148,279, which is incorporated herein by reference. In various embodiments, the first thermoplastic material may include a thermoplastic dynamic vulcanizate of a rubber in a non-elastomeric matrix resin such as polypropylene. Thermoplastic vulcanizates commercially available from Exxon-Mobil under the tradename Santoprene™ are believed to be vulcanized domains of EPDM in polypropylene.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

What is claimed is:

1. A golf ball having a core and a cover, the golf ball formed by a process comprising:
    forming the core by:
        printing a first core portion including a first plurality of concentric shells;
        printing a second core portion including a second plurality of concentric shells;
        fusing the first core portion with the second core portion to form the core;
        wherein each of the first core portion and the second core portion includes a radially inward portion, a radially outward portion, and an intermediate portion that is radially disposed between the radially inward portion and the radially outward portion;
        wherein printing each of the first core portion and the second core portion includes:
            printing the radially inward portion consisting of a first material;
            printing the radially outward portion consisting of a second material; and
            printing the intermediate portion using a varying blend of components comprising the first material and the second material; and
    molding the cover over the core such that the cover radially surrounds the core, the molding including at least one of compression molding and injection molding.

2. The process of claim 1, wherein fusing the first core portion with the second core portion includes:
    placing the first core portion and second core portion in an opposing arrangement within a mold;
    heating the mold to a temperature above the melting point of each of the respective first core portion and second core portion.

3. The process of claim 1, wherein the spherical core has a diameter of from about 22 mm to about 42 mm; and
    wherein each of the first plurality of concentric shells and the second plurality of concentric shells respectively include from about 9 shells to about 55 shells.

4. The process of claim 1, wherein printing the first core portion and printing the second core portion each respectively include printing via fused filament fabrication.

5. The process of claim 1, wherein the first plurality of concentric shells includes a first shell and a second shell; and
    wherein each of the first and second shells respectively have a homogeneous material composition; and
    wherein the material composition of the first shell is different than the material composition of the second shell.

6. The process of claim 1, wherein each of the first plurality of concentric shells is disposed at a different radial position within the first core portion; and
    wherein printing a first core portion includes varying the material composition of each respective shell as a function of the radial position of that shell.

7. The process of claim 1, wherein printing the second core portion includes depositing the second plurality of concentric shells onto the first core portion.

8. The process of claim 1, wherein at least one of the first plurality of shells and at least one of the second plurality of shells is discontinuous.

9. A golf ball comprising:
    a core formed from a plurality of concentric shells;
    wherein the plurality of concentric shells includes:
        a first set of concentric shells consisting of a first material and defining an inner portion of the core;
        a second set of concentric shells disposed radially outward from the first set of concentric shells, and defining an intermediate portion of the core; and
        a third set of concentric shells consisting of a second material and disposed radially outward from the second set of concentric shells, and defining an outer portion of the core;
    wherein the second set of concentric shells consists of a varying blend of the first material and the second material to gradually transition from the first set of concentric shells to the third set of concentric shells, wherein the varying blend is a mixture of the first material with the second material in varying proportions; and a cover including a plurality of dimples, the cover disposed in a surrounding arrangement about the core, the cover formed through at least one of injection molding and compression molding; and wherein the plurality of concentric shells includes from about 9 shells to about 55 shells.

10. The golf ball of claim 9, wherein the blend of the first material and the second material that is used to form the second set of concentric shells varies as a function of a radial distance.

11. The golf ball of claim 9, wherein each shell of the first set of concentric shells, the second set of concentric shells, and the third set of concentric shells has a respectively homogenous material composition.

12. The golf ball of claim 9, wherein the core further includes a homogenous inner core disposed radially interior to the first set of concentric shells.

13. The golf ball of claim 12, wherein the inner core is formed through injection molding, compression molding, or casting.

* * * * *